(12) United States Patent
Gazzard et al.

(10) Patent No.: US 7,167,707 B1
(45) Date of Patent: Jan. 23, 2007

(54) SYSTEMS AND METHODS FOR GSM SELECTION

(75) Inventors: Daryl Gazzard, Alpharetta, GA (US); John Carvalho, Berskshire (GB); Prabha Aithal, Austin, TX (US)

(73) Assignee: Cingular Wireless II, L.L.C., Atlanta, GA (US)

( * ) Notice: Subject to any disclaimer, the term of this patent is extended or adjusted under 35 U.S.C. 154(b) by 199 days.

(21) Appl. No.: 10/775,149

(22) Filed: Feb. 11, 2004

Related U.S. Application Data

(60) Provisional application No. 60/447,106, filed on Feb. 12, 2003.

(51) Int. Cl.
H04Q 7/20 (2006.01)

(52) U.S. Cl. .............. 455/434; 455/435.2; 455/456.1; 455/456.6

(58) Field of Classification Search ............ 455/422.1, 455/432.1, 434, 435.1, 435.2, 435.3, 456.1, 455/456.6, 558
See application file for complete search history.

(56) References Cited

U.S. PATENT DOCUMENTS

| | | | |
|---|---|---|---|
| 5,915,219 A * | 6/1999 | Poyhonen ................ 455/435.2 |
| 5,956,637 A * | 9/1999 | Ericsson et al. .......... 455/432.3 |
| 5,999,811 A * | 12/1999 | Molne ..................... 455/432.3 |
| 6,546,246 B1 * | 4/2003 | Bridges et al. ........... 455/432.1 |
| 6,636,742 B1 * | 10/2003 | Torkki et al. ............. 455/456.1 |
| 2002/0082049 A1 * | 6/2002 | Prise ......................... 455/558 |
| 2002/0147012 A1 * | 10/2002 | Leung et al. ................ 455/433 |
| 2004/0066756 A1 * | 4/2004 | Ahmavaara et al. ........ 370/328 |
| 2004/0087305 A1 * | 5/2004 | Jiang et al. .............. 455/432.1 |
| 2005/0101323 A1 * | 5/2005 | De Beer ................... 455/435.2 |

* cited by examiner

Primary Examiner—Temica Beamer
(74) Attorney, Agent, or Firm—Paul, Hastings, Janofsky & Walker LLP

(57) ABSTRACT

The present invention provides enhanced GSM network selection process. The present utilizes a LAC, along with unique selection files, in selecting a network service provider, thus providing granularity in network selection process. A mobile first searches for a home network LAC. If the mobile finds a home network LAC, the mobile then attempts to perform a location update on the home network LAC. If not, the mobile searches for a preferred network LAC. If the mobile does not find a preferred network LAC, the mobile than searches for a preferred network PLMN.

30 Claims, 9 Drawing Sheets

SYSTEMS AND METHODS FOR GSM SELECTION

CROSS-REFERENCE TO RELATED APPLICATIONS

This application claims the benefit of U.S. Provisional Application No. 60/447,106, filed Feb. 12, 2003, which is incorporated herein by reference herein in its entirety.

BACKGROUND OF THE INVENTION

1. Field of the Invention

The present invention relates generally to communication systems and, more particularly, to providing an improved method for Global System for Mobile communication (GSM) network selection.

2. Description of the Related Art

Global System for Mobile communication (GSM) is one of the most widely used wireless access systems in today's fast growing communication infrastructure. As is well known, main components of a GSM network include a Mobile Station (MS or "mobile"), at least one Base Transceiver Station (BTS), a Base Station Controller (BSC), and a Mobile Switching Center (MSC). A MS consists of Mobile Equipment (ME) along with a Subscriber Identity Module (SIM). A SIM includes an International Mobile Subscriber Identity (IMSI), which is a unique identifier of a subscriber. A BTS is physical equipment, such as a radio tower, that enables a radio interface to communicate with a MS. Each BTS may serve more than one MS. The BSC manages radio resources, including a BTS, and may be connected to several BTSs. The BSC and BTS components, in combination, are generally referred to as a Base Station System (BSS). A MSC performs a switching function for the network, as well as registration, authentication, location updating, handovers, and call routing, among other functions.

A GSM network is made up of geographic areas. As shown in FIG. 1, these areas include cells 102, location areas (LAs) 104, MSC areas 106, and public land mobile network (PLMN) area 108. Cell 102 corresponds to an area served by one BTS. The GSM network identifies each cell via a cell global identity (CGI), which is broadcasted by each BTS. The CGI is made up of a Mobile Country Code (MCC), a Mobile Network Code (MNC), a Location Area Code (LAC), and a Cell Identity (CI). LA 104 typically encompasses a group of cells and is used, for example, to limit an area in which a subscriber is paged. Each LA is served by one or more BSCs, which are themselves controlled by a single MSC. MSC area 106 represents a part of a GSM network implementation that is covered by a single MSC. A MSC area typically consists of more than one LA. PLMN area 108 is an area served by one network operator. Individual PLMNs are identified by their MCC and MNC, where the MNC specifies a home PLMN network of a MS, or mobile.

In the mobile marketplace, there are geographical areas that are often covered by more than one GSM network service provider. Conventionally, when a mobile powers on, the mobile camps onto a cell in which it is currently located and listens for a CGI broadcasted by a BTS of the cell. The mobile then selects a network service provider based only on a MNC and MCC in the CGI. Since the conventional network selection process utilizes only a MCC and a MNC, the process is often incapable of properly selecting an appropriate network service provider, especially in geographical areas in which completing network service providers have overlapping coverage. In an area where there is coverage from a home operator and a competitor, a mobile recognizes both networks' MCC and MNC. However, if the home operator's signal level and/or quality is lower that the that of the competitor's, the mobile selects the competitor's network and may stay on it. This causes the home operator to incur roaming charges on behalf of the subscriber, thus resulting in a loss of revenue. Furthermore, a network service provider must rely on other service providers (i.e., competitors) to allow its subscriber to operate (and roam). The home network service provider does not have control over roaming of its subscribers.

In view of the foregoing, there is a need for an improved GSM selection process and related functionality.

SUMMARY OF THE INVENTION

The present invention provides improved GSM network selection methodologies by improving the granularity of selection criteria. Specifically, the present invention provides an enhanced GSM selection process that allows a mobile to select a network service provider based on a geographic region, rather than by a whole country or a PLMN. Take the following as an example. A home network service provider provides service in Atlanta and New York, and a Service Provider A, which has a roaming agreement with the home network service provider, provides service in New York and Boston. When a mobile is in Atlanta, the mobile is registered with the home network service provider. In Boston, the mobile is roaming on the Service Provider A. In New York, the present invention enables the mobile to select the home network service provider rather than the Service Provider A, regardless of the home network service provider's signal level and/or quality. The appropriate selection is accomplished by utilizing the LAC in the selection process.

In the present invention, the SIM is programmed with unique selection files that provide granularity of selection criteria. The files are then used in the network selection process. The following files are defined and employed, as appropriate, in the present invention.

A "Power on Band Priority" file dictates in what order to scan frequency bands at initial mobile power up.

A "Home Network LAC" file contains all location areas that are to be considered as a part of a home network.

A "Home Band Selector" file dictates which frequency bands to scan when a mobile is in a home MCC but not within the home network LACs.

A "Home Band Priority" file dictates in what order to scan frequency bands within a home MCC.

A "Full Band Selector" file dictates which frequency bands to scan when a mobile is not in a home MCC.

A "Full Band Priority" file dictates in what order to scan frequency bands when a mobile is not in a home MCC.

A "Preferred Network LAC" file (or a "Partner Network LAC" file) contains location areas of preferred networks.

Significantly, since these files are stored in the SIM, the files may be updated over-the-air. Thus, the present invention allows a network provider to control how its subscribers attach to a network. As a result, it is possible to maximize the amount of time a given subscriber remains within a home network or another, preferred, network.

In an embodiment of the present invention, when a mobile powers on, the mobile scans frequency bands according to the Power on Band Priority file. The mobile then searches for a home network LAC. The mobile compares the LAC found to the Home Network LAC file. If the LAC found is listed in the Home Network LAC file, the mobile attempts to perform a location update on that network and stops scanning. If the mobile does not find a home network LAC, the mobile then searches for a preferred network LAC by utilizing the Preferred Network LAC file. If the mobile finds a preferred network LAC, the mobile attempts to perform a location update on the preferred network LAC. If not, the mobile searches for a preferred network LAC by utilizing the Preferred Network LAC file. If the mobile finds the preferred network PLMN, the mobile attempts to perform a location update on the preferred network PLMN. If the mobile does not find a preferred network PLMN, the mobile proceeds with the conventional selection process.

In an alternative embodiment, when a mobile powers on, the mobile may first determine whether the last network (i.e., a network service provider used before being powered down) was the optimal service provider. If the last network was a home MCC or within a home band, the mobile may scan the last band to search for a home network LAC or the last network. If the mobile finds a home network LAC or the last network, the mobile attempts to perform a location update on it. If not, the mobile scans frequency bands according to the Power on Band Priority file to find a home network LAC. In another alternative embodiment, when a mobile powers on, instead of utilizing the Power on Band Priority file, which bands to scan or in what order to scan is determined based on the last network within a mobile's capability.

In another embodiment, a mobile performs a reselection process to find a more desirable frequency band when the most desirable frequency band defined by a home network service provider is unavailable when it powers on.

A mobile may perform a reselection scan when the mobile is in a home MCC but camped on a network other than one indicated in the Home Network LAC file. When a period defined by a home PLMN timer in a SIM of the mobile expires, the mobile rescans frequency bands listed in the Home Band Selector file to locate a location area which is defined in the Home Network LAC file. If the mobile finds a home network LAC, the mobile attempts to perform a location update on the home network LAC. Otherwise, the mobile remains on incumbent network.

A mobile may also perform a reselection scan when the mobile is not in a home MCC and camped on a network other than one contained in the Preferred Network LAC file. When a period defined by a home PLMN rescan timer expires, the mobile rescans frequency bands in the Full Band Selector file to locate a location area that is defined in the Preferred Network LAC file or in a Preferred PLMN file in a SIM of the mobile. In order to allow prioritized selection as defined in both the Preferred PLMN file and the Preferred Network LAC file, a list of LACs found during scanning is prepared. This list is compared with the Preferred Network LAC file and then with the Preferred PLMN file in order to find the highest priority LAC or network to select.

In another embodiment, a mobile performs an enhanced reselection process when the mobile loses network coverage while it is powered on.

If a mobile loses network coverage when it is attached to a home network LAC, the mobile re-initiates the selection process to enable preferential network selection. The mobile utilizes the Home Band Priority file and the Home Band Selector file to define the frequency bands to scan and order of scanning.

If a mobile loses network coverage when it is attached to a preferred network LAC, a preferred PLMN, or an undefined PLMN, the mobile re-initiates the selection process. If the mobile is within a home MCC, the mobile utilizes the Home Band Priority file and the Home Band Selector file. If the mobile is not within a home MCC, the mobile utilizes the Full Band Selector file to define the frequency bands to scan.

In yet another embodiment, when a mobile supporting multi frequency bands powers on or loses network coverage, the mobile first determines a MCC in which it is operating. The mobile then limits a number of frequency bands to scan by forbidding a network scanning based on the MCC.

DETAILED DESCRIPTION OF THE INVENTION

Figure 1:
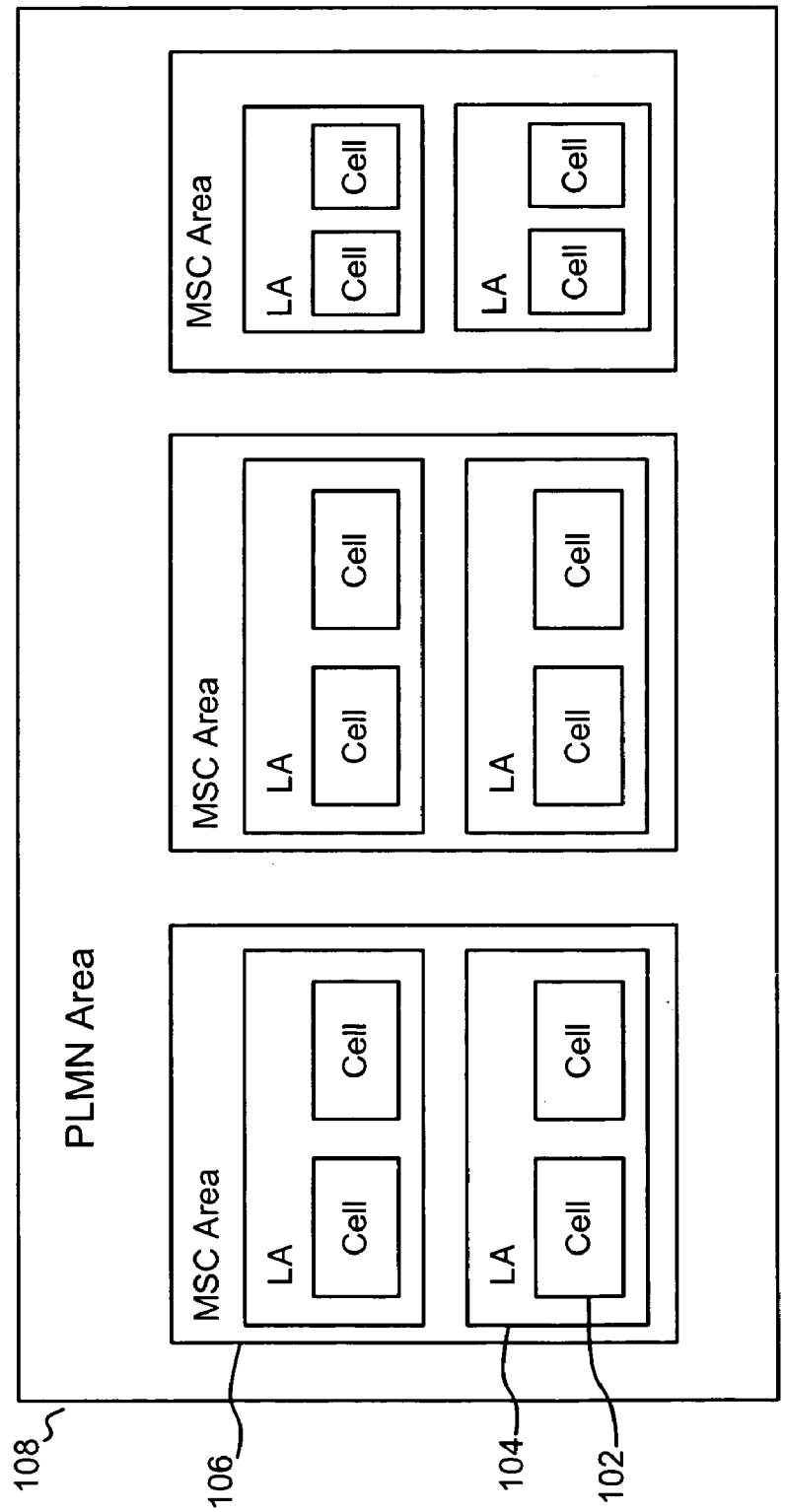
FIG. 1 illustrates the hierarchy of a GSM network.

The present invention provides an enhanced GSM selection process that allows a mobile to select a service provider by, among other things, a geographic region by utilizing more granular information, such as a LAC, and by consulting several new "selection files."

One or more of the following new selection files are employed by the present invention and are preferably programmed on a SIM. Consequently, each selection file may be populated by a network operator at distribution and/or updated by the network operator via an over-the-air transmission whenever desired.

A "Home Network LAC" file contains all location areas that are to be considered as a part of a home network. These are considered effectively as a home PLMN, and when camped on these, a mobile does not initiate a scan to find a more favorable network. If desired, this file may only contain LACs within a home MCC. For example, a service provider may define certain combinations, such as, for example, all 310 150, 310 170 and 310 410, together with LACs for NYC in the Home Network LAC file.

A "Home Band Selector" file dictates which frequency bands to scan when in a Home MCC, but not within home network LACs. This file may be as small as one byte. Presently, GSM is only available in 4 bands (800 MHz, 900

MHz, 1800 MHz, and 1900 MHz). However, to provide for future compatibility, the Home Band Selector file may allow for more than 4 bands, preferable 8 bands, to be designated for searching. For example, a service provider may set bits for 800 MHz and 1900 MHz in the Home Band Selector file, thereby precluding a mobile from scanning the 900 MHz and 1800 MHz bands.

A "Home Band Priority" file dictates in what order to scan supported frequency bands within a home MCC. The Home Band Priority file may have the equivalent byte size as the bits in the Home Band Selector file. This file may have entries from 1 to 8, defining a priority order of each frequency band. For example, a service provider may set 1900 MHz as first priority and 800 MHz as second priority in dual band markets, but set 800 MHz as first priority in other markets.

A "Full Band Selector" file dictates which frequency bands to scan when not in a home MCC. This file can be as small as one byte. Preferably, this file may include 8 bands to be designated for search to provide the same flexibility as described above for the Home Band Selector file.

A "Full Band Priority" file dictates in what order to scan frequency bands when a mobile is not in a home MCC. The Full Band Priority file may have the equivalent byte size as the bits in the Full Band Selector file. This file may have entries from 1 to 8, defining a priority order of each frequency band.

A "Power on Band Priority" file dictates in what order to scan supported frequency bands at initial mobile power up. This file may have the equivalent byte size as the bits in the Full Band Selector file. The Power on Band Priority file may have entries from 1 to 8 defining a priority order of each frequency band. For example, a service provider could set an order of 1900 MHz, 800 MHz, 1800 MHz, and 900 MHz.

A "Preferred Network LAC" file (or a "Partner Network LAC" file) contains the location areas of partner networks which are to be preferred over non-partner networks. This file may be built in priority order, which can be set based on negotiated rates between a service provider and partners. In addition, the Preferred Network LAC file preferably allows a service provider to provide different prioritization between a PLMN nationally and certain LACs within that PLMN. When camped on a partner or preferred network LAC within a home MCC, a mobile may initiate a scan periodically to seek out a home network LAC.

Additional selection files or lists may also be implemented to further improve the ability of a service provider to control roaming. For example, a "forbidden" list of network LACs may be implemented. Such list provides greater granularity than a conventional GSM specified forbidden list, which is defined only by MCC and MNC. This improves a method for barring network access. For example, if a mobile camps on a network in an area listed in the forbidden list of network LACs, the mobile will not attempt to perform a location update. This removes reliance on a competitor to implement National Roaming Restriction correctly throughout its network and places the control back with a home operator. Alternatively, the Preferred Network LACs may be flagged to indicate that roaming is not allowed outside these areas. This would have less storage impact on the SIM.

Reference will now be made in detail to the preferred embodiments of the present invention, examples of which are illustrated in the accompanying drawings.

Figure 2:
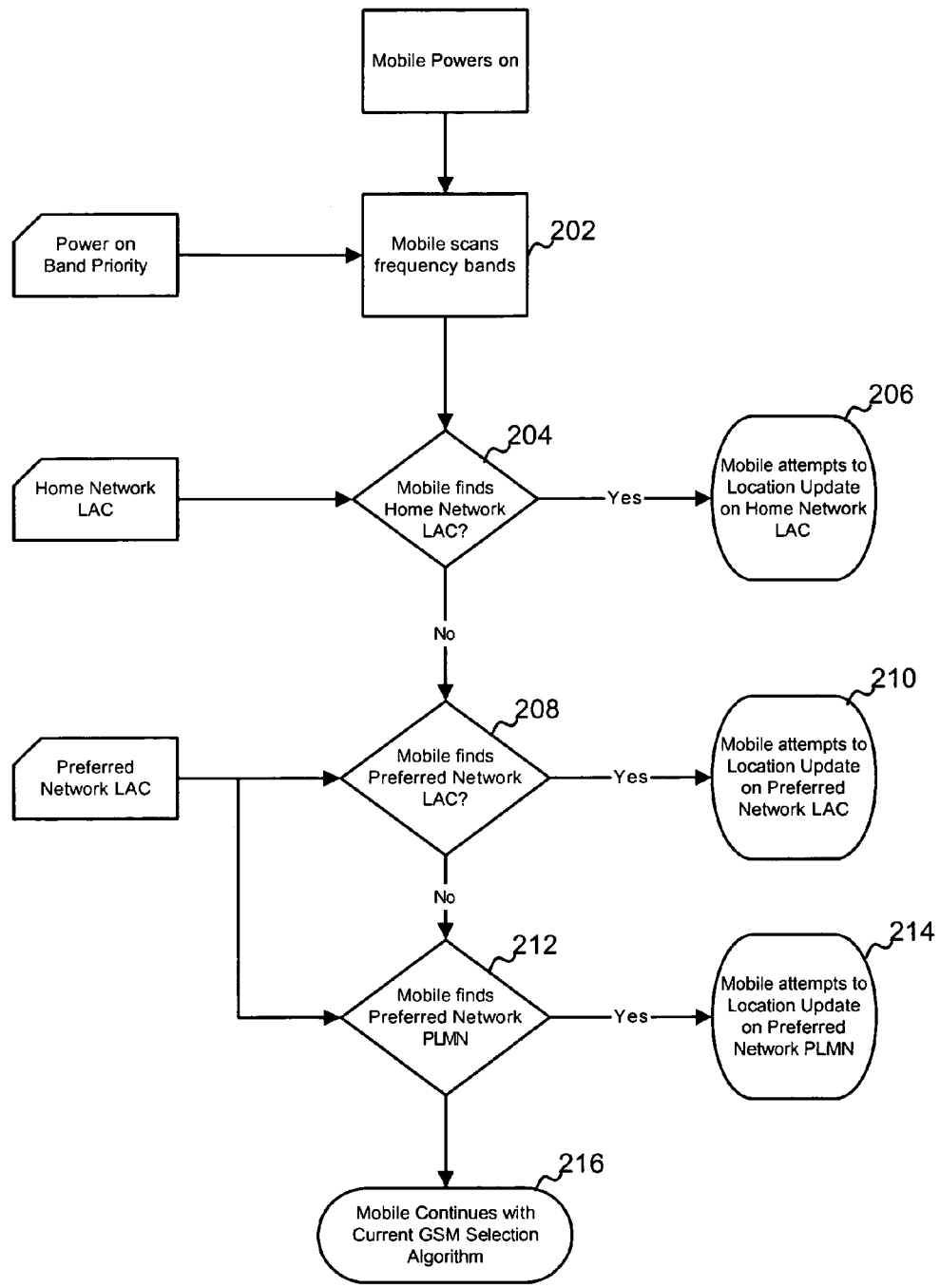
FIG. 2 is a flow chart illustrating an exemplary network selection process at power on according to a preferred embodiment of the present invention.
Figure 3:
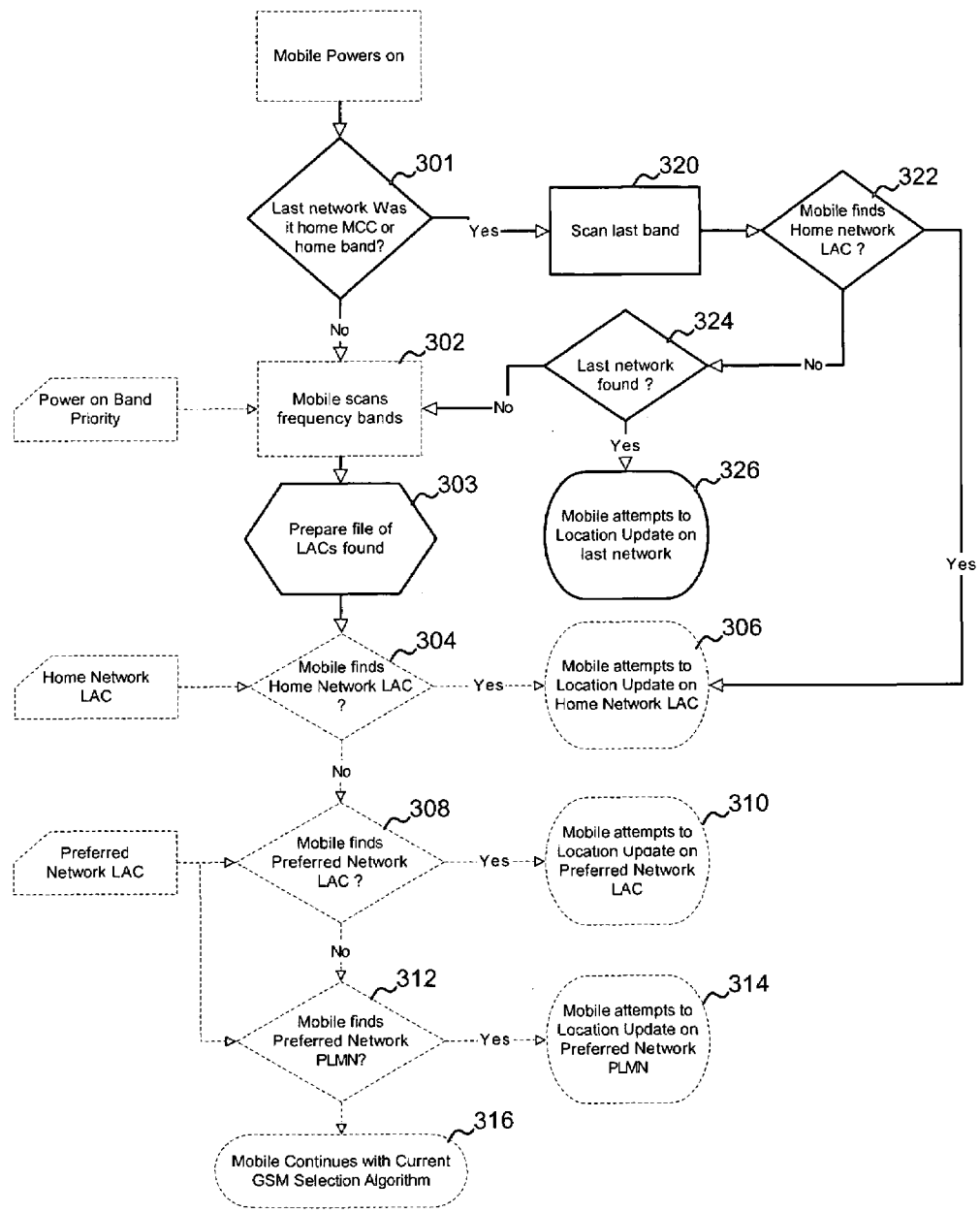
FIG. 3 is a flow chart illustrating another exemplary network selection process at power on according to a preferred embodiment of the present invention.
Figure 4:
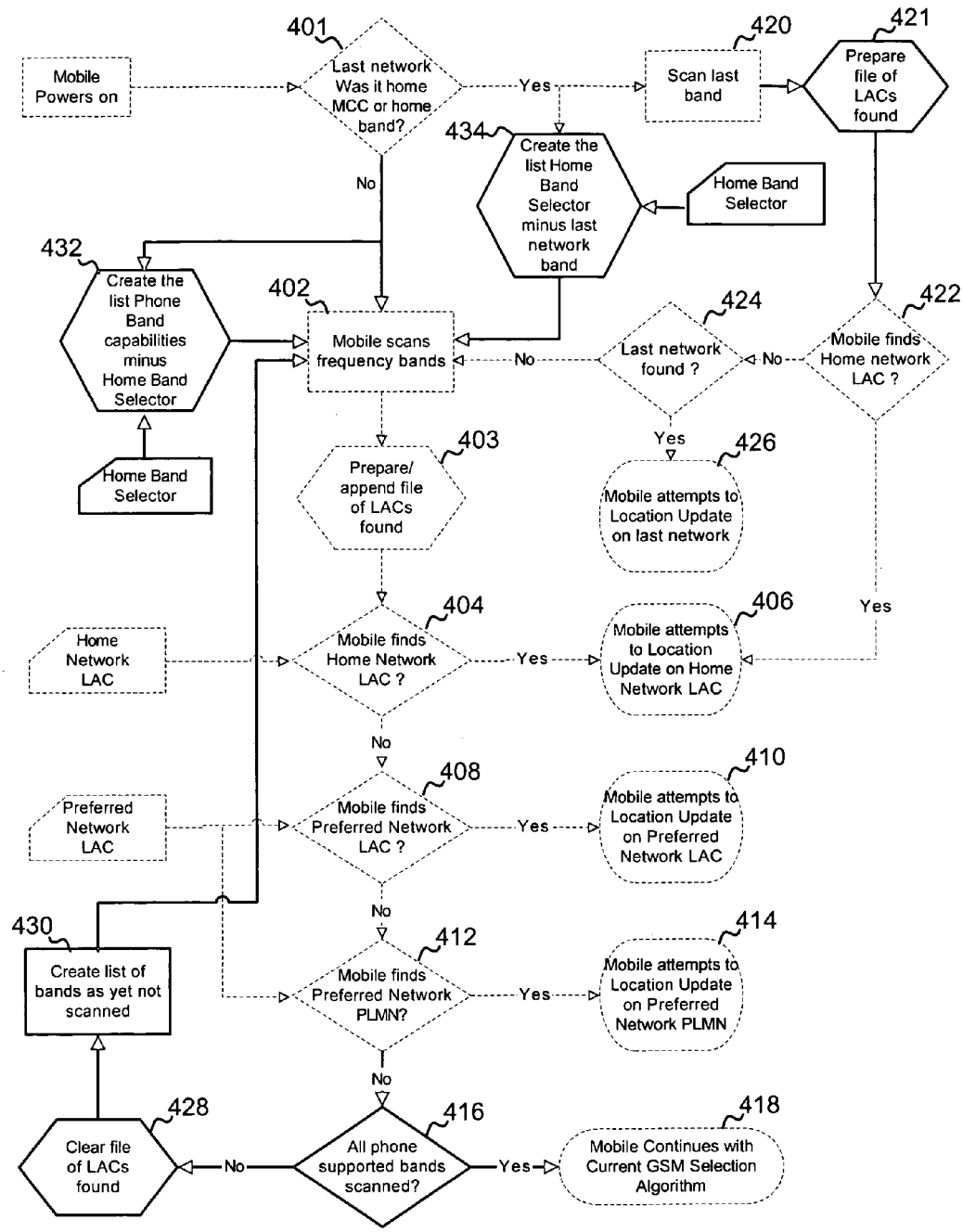
FIG. 4 is a flow chart illustrating yet another exemplary network selection process at power on according to a preferred embodiment of the present invention.

FIGS. 2–4 are flow charts illustrating examples of a selection process at power on according to preferred embodiments of the present invention.

Referring first to FIG. 2, at step 202, a mobile scans one or more frequency bands when a mobile first powers on. Which bands to be scanned and in what order to scan is determined by the Power on Band Priority file defined above. By scanning the frequency bands according to the order defined in the Power on Band Priority file, rather than randomly scanning all of the frequency bands, the time spent on scanning can be reduced, thus improving overall scanning efficiency. The mobile also prepares a list of LACs found during scanning.

At step 204, the mobile searches for a home network LAC. The mobile compares a LAC found during scanning to the Home Network LAC file. If the LAC found during scanning is listed in the Home Network LAC file then, at step 206, the mobile attempts to perform a location update on the LAC found (i.e., the home network LAC) and stops scanning.

If the mobile does not find a home network LAC, the mobile then at step 208, searches for a preferred network LAC. The mobile compares the list of LACs found to the Preferred Network LAC file and creates a candidate network list. The candidate network list may be generated in order of descending priority where the priority is defined by a list of LACs of partner network in the Preferred Network LAC file. The candidate network list from scanning may be stored for future use which may be referred to as a partner list. The partner list may contain partner network LACs and associated control channel frequency. The partner list may also be time stamped to indicate the time of the scan. If any of the LACs found is listed in the Preferred Network LAC file then, at step 210, the mobile attempts to perform a location update on the preferred network LAC.

If the mobile does not find a preferred network LAC then, at step 212, the mobile searches for a preferred network PLMN. The mobile may create a candidate network list that includes preferred network PLMNs for future use. Alternatively, the candidate network list created to be compared with the Preferred Network LAC file can be used since a PLMN is a subset of LAC.

If the mobile finds a preferred network PLMN then, at step 214, the mobile attempts to perform a location update on the preferred network PLMN. If not, at step 216, the mobile continues with the conventional GSM selection process to select a proper network.

FIG. 3 is a flow chart illustrating another an exemplary network selection process at power on according to a preferred embodiment of the present invention. This exemplary selection process is similar to the exemplary selection process shown in FIG. 2. The difference is that in this exemplary selection process, when a mobile powers up, the mobile first determines whether the last network (i.e., a service provider used before being powered down) was the optimal service provider.

At step 301, a mobile determines whether the last network was in a home MCC or within a home band. If the last network was neither in a home MCC nor within a home band, at step 302, the mobile scans frequency bands according to the Power on Band Priority file.

At step 303, the mobile prepares a file containing LACs found during scanning. At step 304, the mobile compares the file containing the LACs found to the Home Network LAC file to find a home network LAC. If one of the LACs found is listed in the Home Network LAC file, at step 306, the mobile attempts to perform a location update on the LAC found and stops scanning.

If the mobile does not find a home network LAC, at step 304, the mobile then proceeds with the same steps shown in FIG. 2. That is, at step 308, the mobile searches for a preferred network LAC using the Preferred Network LAC file. If the mobile fails to find a preferred network LAC, at step 312, the mobile searches for a preferred network PLMN. If all fails, at step 316, the mobile continues with the conventional GSM selection process to select a proper network.

If, however, at step 301, it is determined that the last network was in a home MCC or within a home band, at step 320, the mobile scans the last band. Next, at step 322, the mobile searches for a home network LAC using the Home Network LAC file.

If the mobile finds a home network LAC, at step 306, the mobile attempts to perform a location update on the home network LAC. If not, at step 324, the mobile search for the last network.

If the mobile finds the last network, at step 326, the mobile attempts to perform a location update on the last network. If not, the mobile scans frequency bands according to an order in the Power on Band Priority file to find a home network LAC at step 302 and proceeds with the following steps as described above.

FIG. 4 is a flow chart illustrating yet another an exemplary network selection process at power on according to a preferred embodiment of the present invention. In this exemplary selection process, the Power on Band Priority file is not used. Within a mobile's capabilities, which bands to be scanned and in what order to scan is determined based on network where the mobile was last registered. This removes the requirement to add new frequency bands to the Power on Band Priority file as additional bands become available for GSM, regardless of mobile's capabilities or a mobile's roaming status. This selection process may also speed up network selection whilst roaming, without requiring a mobile to automatically attempt to perform a location update on the last registered network as in the standard GSM power-on selection process.

At step 401, the mobile determines whether the last network was in a home MCC or within a home band. If the last network was in a home MCC or within a home band, at step 434, the mobile creates a list of frequency bands by removing the last network's frequency band from the Home Band Selector file. This reduces the number of frequency bands to be scanned. At step 402, the mobile then scans frequency bands specified in the list.

At step 403, the mobile prepares a file containing a list of LACs found during scanning. At step 404, the mobile searches for a home network LAC. The mobile compares the file containing a list of LACs found to the Home Network LAC file. If any of the LACs found is listed in the Home Network LAC file, at step 406, the mobile attempts to perform a location update on the LAC and stops scanning.

If the mobile does not find a home network LAC, at step 508, the mobile searches for a preferred network LAC. If the mobile fails to find a preferred network LAC, at step 412, the mobile searches for a preferred network PLMN.

If the mobile does not find a preferred network PLMN, at 418, the mobile determines whether all frequency bands that are supported by the mobile have been scanned. If the mobile determines that all frequency bands have been scanned, at step 416, the mobile continues with the conventional GSM selection process.

If, however, the mobile determines that all of the frequency bands supported by the mobile have not been scanned, at step 428, the mobile clears the file containing the list of LACs found that was prepared at step 403. At step 430, the mobile then creates a list of frequency bands that have not been scanned and returns to step 402 to scan the frequency bands in the list. Thereafter, the mobile proceeds with the steps described previously until all of the frequency bands supported by the mobile have been scanned.

Alternatively, if it is determined that the last network was a home MCC or a home band at step 401, the mobile may scan the last band at step 420, in addition to creating the list at step 434. At step 421, the mobile then prepares a file containing a list of LACs found while scanning the last band. Next, at step 422, the mobile searches for a home network LAC by comparing the list of LACs found to the Home Network LAC file.

If the mobile finds a home network LAC, at step 406, the mobile attempts to perform a location update on the home network LAC. If not, at step 424, the mobile search for the last network. If the mobile finds the last network, at step 426, the mobile attempts to perform a location update on the last network. If not, at step 402, the mobile scans the frequency bands specified in the list prepared at step 434. The mobile then proceeds with the following steps as described above.

Returning to step 401, if the mobile determines that the last network was neither in a home MCC nor within a home band, at step 432, the mobile creates a list of frequency bands by removing the frequency bands listed in the Home Band Selector file from phone band capabilities (i.e., frequency bands supported by the mobile). Thereafter, at step 402, the mobile scans the frequency bands in the newly created list and proceeds with the following steps as described above.

Figure 5:
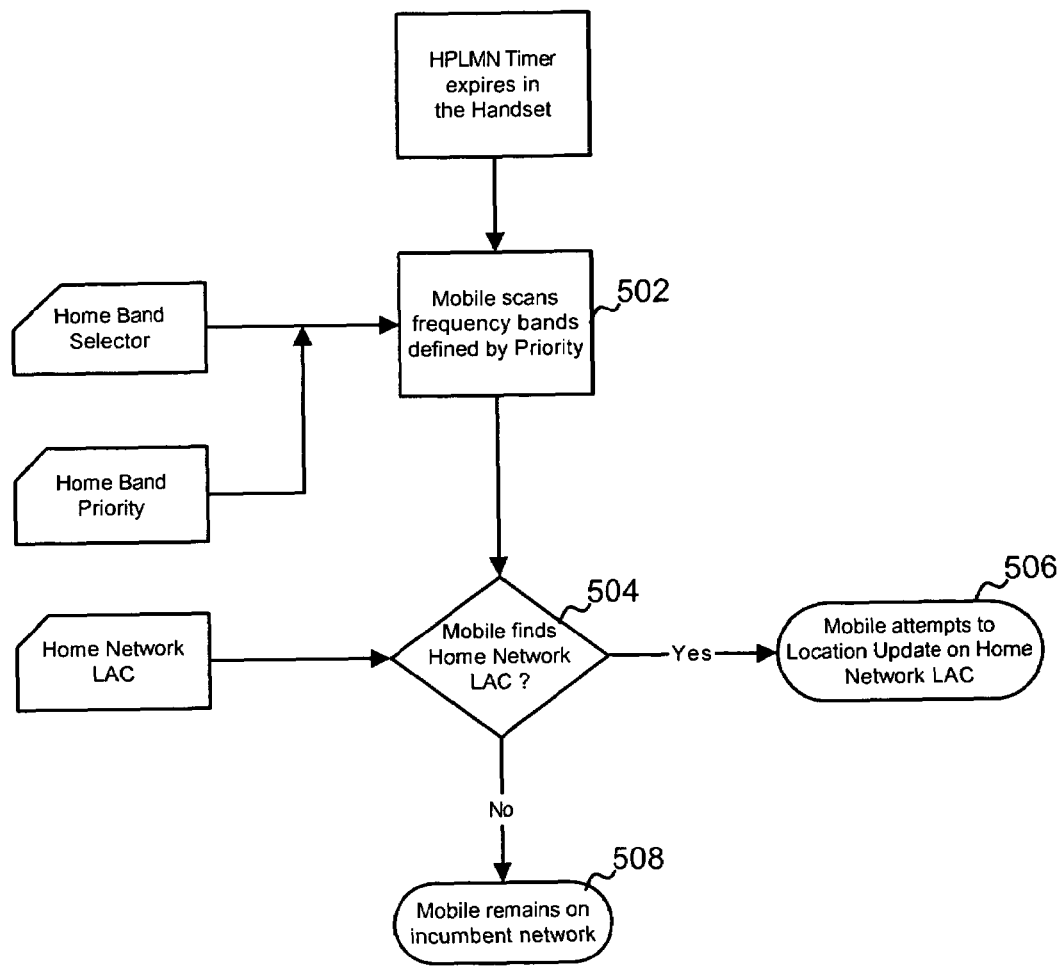
FIG. 5 is a flow chart illustrating an exemplary network reselection process according to a preferred embodiment of the present invention.
Figure 6:
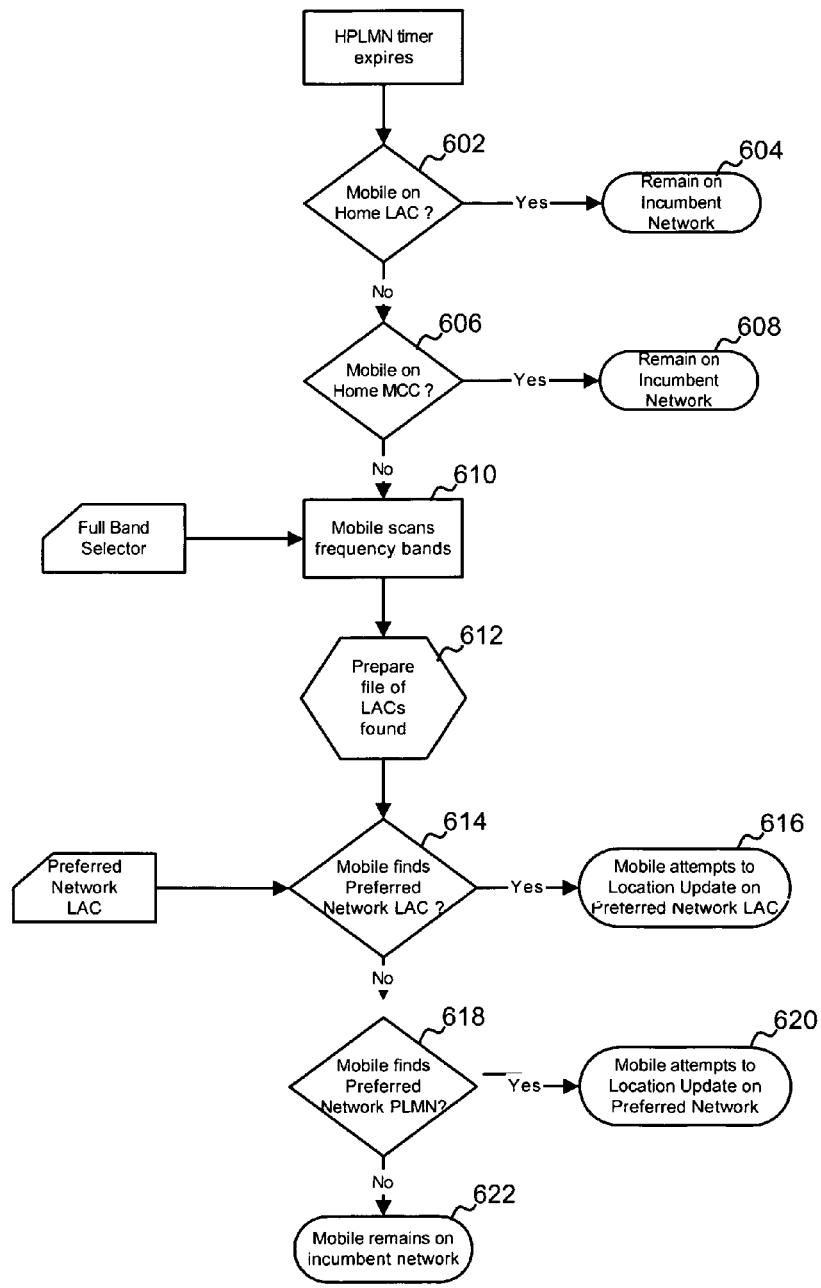
FIG. 6 is a flow chart illustrating another exemplary network reselection process according to a preferred embodiment of the present invention.

The examples of power-on selection processes described above allow a mobile to find the most desirable network defined by a home network service provider. Sometimes, however, the most desirable network is unavailable because of the location of the mobile when it powers on. But, as the mobile moves about, more desirable networks may become available. For example, if a mobile is not on the service provider's network, it is desirable for the mobile to find the service provider's network or at least a network providing more desirable roaming rates. FIGS. 5 and 6 show exemplary reselection processes that allows a mobile to continue to look for a more desirable network.

FIG. 5 is a flow chart illustrating an exemplary reselection process according to a preferred embodiment of the present invention. In this example, a mobile performs reselection scan when, for example, the mobile is in a Home MCC, camped on a network other than one contained in the Home Network LAC file, and is in IDLE mode. A SIM of the mobile includes a home PLMN timer that starts when the mobile is roaming.

At step 502, when a period defined by the home PLMN timer expires, the mobile scans (or rescans) frequency bands in the Home Band Selector file according to the priority defined in the Home Band Priority file to find a location area, which is defined in the Home Network LAC file.

At step 504, the mobile searches for a home network LAC. The mobile compares a LAC found during scanning to the Home Network LAC file. If the mobile finds a home network LAC, at step 506, the mobile attempts to perform a location update on the home network LAC. If not, the mobile remains on the incumbent network at step 508.

FIG. 6 is a flow chart illustrating another exemplary reselection process according to a preferred embodiment of the present invention. In this example, a mobile performs reselection scan when, for example, the mobile is not in the Home MCC, camped on a network other than one contained in the Preferred Network LAC file, and is in IDLE mode. When the mobile finds a non-preferred network, the reselection process allows the mobile to periodic rescan to find more desirable network (i.e., a home network or a preferred network) after a period of time.

At step 602, the mobile determines whether it is in a home LAC when a period defined by a home PLMN timer in the mobile expires. Preferably, the mobile determines whether it is in a home LAC after the period defined by the home PLMN timer have expired a number of times. This provides a longer time period before the mobile rescans to find a more desirable network, thereby extending battery life. If the mobile determines that it is on a home LAC, the mobile remains on the incumbent network at step 604. If not, at step 606, the mobile determines whether it is on a home MCC. If it is on a home MCC, at step 608, the mobile remains on the incumbent network. If not, at step 610, the mobile scans frequency bands listed in the Full Band Selector file.

At step 612, the mobile prepares a file including a list of LACs found during scanning. At step 614, The mobile searches for a preferred network LAC. The mobile compares the list of LACs found to the Preferred Network LAC file to find a preferred network LAC. If any of the LACs found is listed in the Preferred Network LAC file, at step 616, the mobile attempts to perform a location update on the preferred network LAC. If not, at step 618, the mobile searches for a preferred network PLMN. The mobile compares the list of LACs found to a Preferred PLMN file on a SIM to find the highest priority network selection. If the mobile finds a preferred network PLMN, at step 620, the mobile attempts to perform a location update on the preferred network PLMN. Otherwise, the mobile remains on the incumbent network at step 622.

Figure 7:
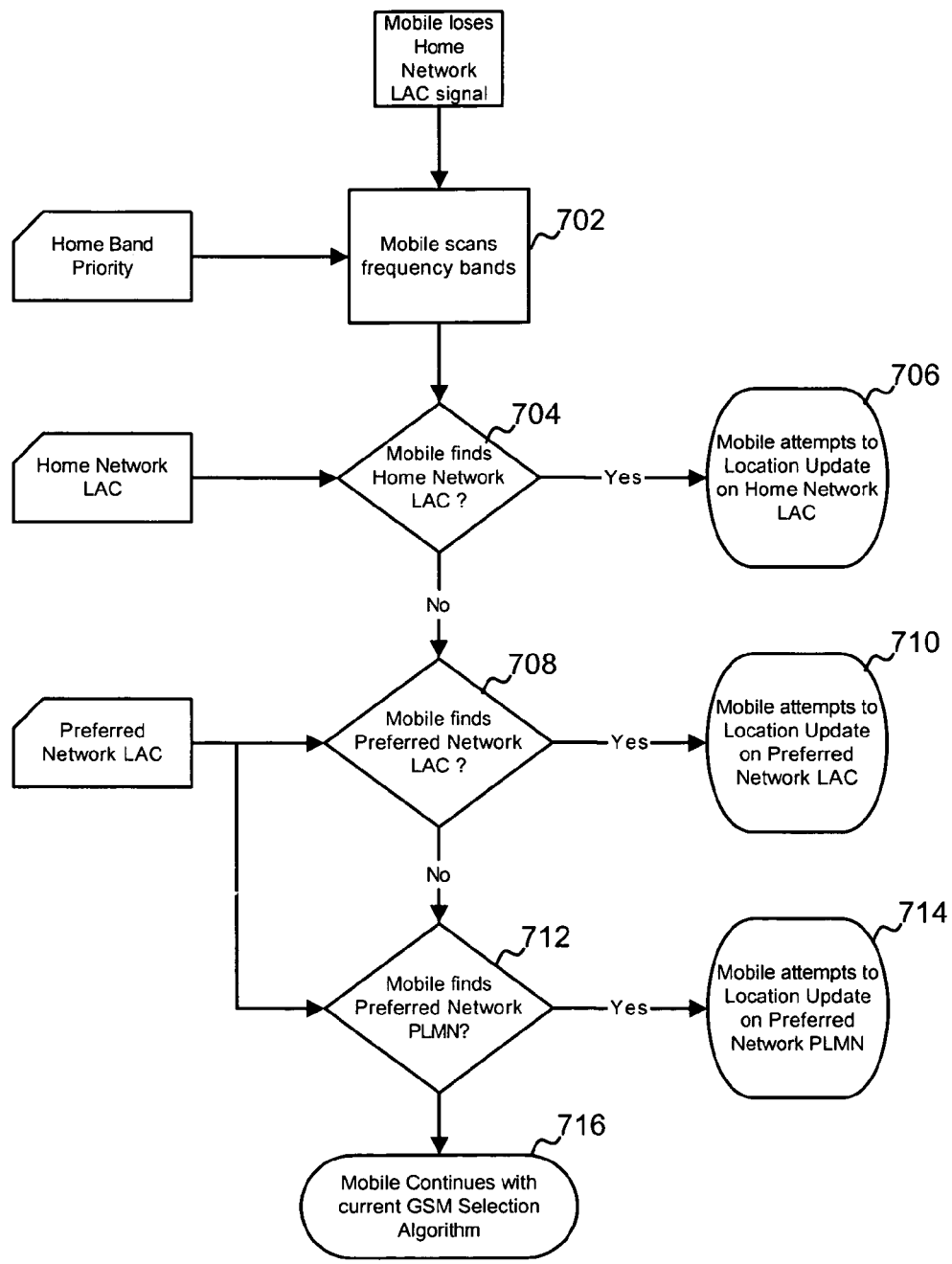
FIG. 7 is a flow chart illustrating an exemplary enhanced network reselection process according to a preferred embodiment of the present invention.
Figure 8:
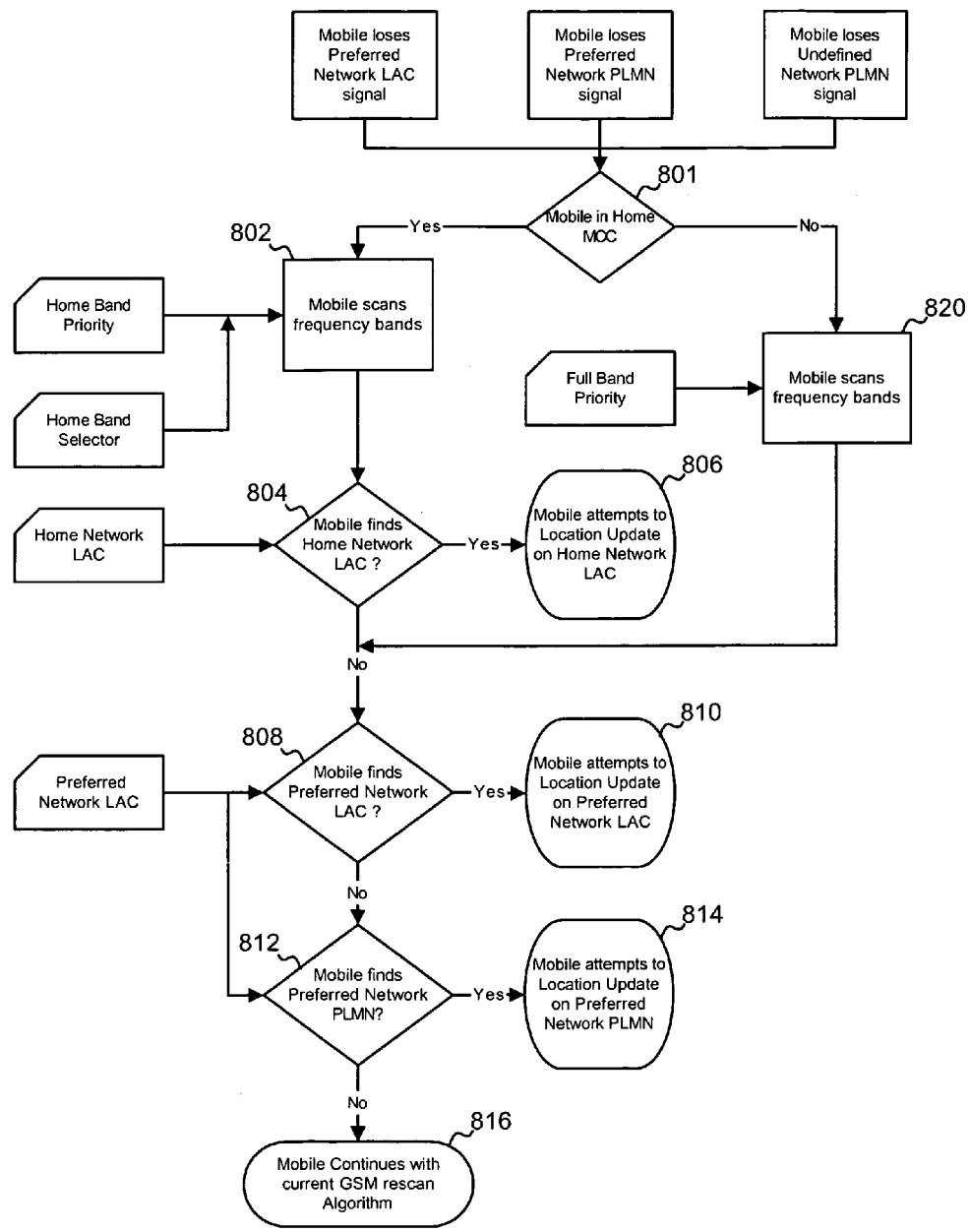
FIG. 8 is a flow chart illustrating another exemplary enhanced network reselection process according to a preferred embodiment of the present invention.

In addition to scanning for a more desirable network service provider, there are situations when enhanced reselection processes may be needed. For example, due to different signal strengths and coverage areas, a mobile might lose network coverage while powered-on. Depending on a network the mobile was last attached to, different selection processes may be used to reselect the network. FIGS. 7 and 8 illustrate examples of enhanced reselection processes.

FIG. 7 is a flow chart illustrating an exemplary enhanced reselection process according to a preferred embodiment of the present invention. In this example, a mobile was attached to a home network LAC when it lost network coverage. When a mobile moves out of coverage area of a home network LAC or loses the signal, the selection process may be re-initiated to enable preferential network selection.

At step 702, the mobile scans frequency bands listed in the Home Band Selector file according to an order in the Home Band Priority file. The mobile also prepares a file including a list of LACs found while scanning the frequency bands. At step 704, the mobile searches for a home network LAC. The mobile compares the file containing a list of LACs found to the Home Network LAC file. If a LAC listed in the list of LACs found is listed in the Home Network LAC file, the mobile stops scanning and attempts to perform a location update on the LAC found (i.e., the home network LAC) at step 706. If the mobile does not find a home network LAC, the mobile proceeds with the following steps as described above. That is, at step 708, the mobile searches for a preferred network LAC using the Preferred Network LAC file. If the mobile fails to find a preferred network LAC, at step 712, the mobile then searches for a preferred network PLMN. If all fails, the mobile continues with the conventional GSM selection process to select a proper network at step 716.

FIG. 8 is a flow chart illustrating another exemplary enhanced reselection process according to a preferred embodiment of the present invention. In this example, a mobile was attached to a preferred network LAC, a preferred network PLMN, or an undefined network PLMN, when it lost network coverage. The mobile then re-initiates a selection process to enable preferential network selection. The mobile is not necessarily within its own MCC. The mobile may be outside the coverage area of a particular serving control channel.

At step 801, the mobile determines whether it is in a home MCC. If the mobile is in a home MCC, at step 802, the mobile scans frequency bands listed in the Home Band Selector file in an order according to the Home Band Priority file. The mobile also prepares a file including a list of LACs found while scanning the frequency bands. At step 804, the mobile searches for a home network LAC. The mobile compares the file containing a list of LACs found to the Home Network LAC file. If a LAC listed in the list of LACs found is listed in the Home Network LAC file, the mobile stops scanning and attempts to perform a location update on the LAC found (i.e., the home network LAC) at step 806. If the mobile does not find a home network LAC, the mobile proceeds with the following steps as described above. That is, at step 808, the mobile searches for a preferred network LAC using the Preferred Network LAC file. If the mobile fails to find a preferred network LAC, at step 812, the mobile searches for a preferred network PLMN. If all fails, the mobile continues with the conventional GSM selection process to select a proper network at step 816.

Returning to step 801, if the mobile is not in home MCC, at step 820, the mobile scans frequency bands according to an order in the Full Band Priority file. Each time the mobile scans a frequency band, the mobile compares a LAC found to the Preferred Network LAC file to find a preferred network LAC at step 808. Also, each time the mobile scans the frequency band, the mobile prepares a list of LACs found. If the LAC found is listed in the Preferred Network LAC file, the mobile attempts to perform a location update on that Preferred network LAC at step 810. If the mobile does not find a Preferred network LAC, at step 812, the mobile searches for a preferred network PLMN. If the mobile does not find a preferred network PLMN, the mobile continues with the conventional GSM selection process to select a proper network at step 816.

Figure 9:
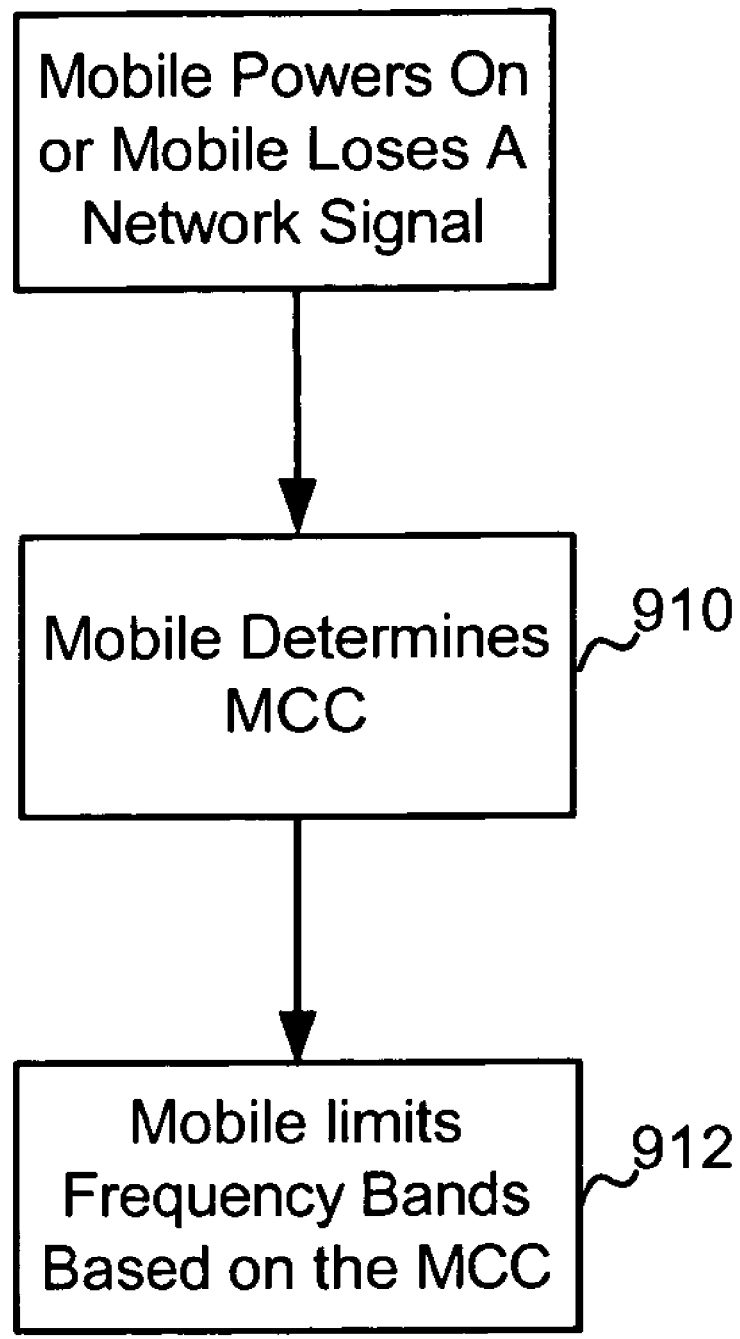
FIG. 9 is a flow chart illustrating an exemplary enhanced network reselection process for a mobile supporting multi frequency bands according to a preferred embodiment of the present invention.

In addition to the enhanced reselection processes described above, a different enhanced reselection process is needed for a mobile supporting multi frequency bands, such as GSM 900/1800/1900, GSM 850/1800/1900, GSM 850/9001800/1900, and GSM 450/900/1800/1900. Currently, when a mobile supporting multi frequency bands powers on, it scans all frequency bands to select a network. Also, when the mobile looses network coverage, the mobile scans for a network in all frequency bands. This causes a delay in registering and re-registering to a network and reduces battery life. FIG. 9 illustrates an example of enhanced reselection process for mobiles supporting multi frequency bands.

When a mobile supporting multi frequency bands powers on or loses a network signal, the mobile determines a MCC the mobile is operating on at step 910. Based on the MCC, the mobile limits frequency bands to scan at step 912. This is achieved by forbidding a network scanning based on a MCC a mobile is operating on. For example, if a mobile is operating in MCC=310 (for U.S. and Canada), the mobile automatically disables a network scanning in frequency bands 450 MHz, 900 MHz and 1800 MHz completely. If the MCC is other than 310, the mobile automatically disables the network scanning in frequency bands 850 MHz and 1900 MHz. This reduces the time spent on scanning and improves overall scanning efficiency.

In describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

What is claimed is:

1. A method for selecting a GSM network service provider comprising:
    scanning at least one frequency band;
    receiving a Location Area Code (LAC);
    selecting a network service provider to attempt to perform a location update based on the LAC; and
    providing a plurality of files in a Subscriber Identity Module (SIM) of a mobile station (MS),
    wherein at least one of the plurality of files is used in selecting the network service provider, and
    wherein the plurality of files includes a first file dictating in what order to scan frequency bands when the MS powers up, a second file containing location areas that are to be considered as a part of a home network, a third file dictating which frequency bands to scan when the MS is in a home MCC but not within home network LACs, a fourth file dictating in what order to scan frequency bands within the home MCC, a fifth file dictating which frequency bands to scan when the MS is not in the home MCC, and a sixth file containing location areas of preferred networks.

2. The method of claim 1, further comprising scanning frequency bands when the MS powers on.

3. The method of claim 1, further comprising searching for a home network LAC including comparing a LAC found while scanning the at least one frequency band location areas that are to be considered as a part of a home network.

4. The method of claim 1, searching for a preferred network LAC.

5. The method of claim 4, further comprising searching for a preferred network PLMN to attempt to perform a location update.

6. The method of claim 1, further comprising determining whether a last network was an optimal service provider before scanning frequency bands.

7. The method of claim 6, wherein if the last network was a home MCC or home band of the MS, the MS scans a frequency band last scanned and searches for the home network LAC to perform a location update.

8. The method of claim 7, wherein if the MS does not find the home network LAC, the MS searches for the last network.

9. The method of claim 8, wherein if the MS finds the last network, the MS attempts to perform a location update on the last network.

10. The method of claim 1, further comprising preparing a file including LACs found during scanning the at least one frequency bands.

11. The method of claim 10, wherein the file including LACs found is used to find a home network LAC.

12. A reselection process in a GSM network for selecting a network service provider comprising:
    providing a first file listing frequency bands to scan when the MS is in a home MCC;
    scanning the frequency bands listed in the first file when a period defined by a home PLMN timer in a SIM of the MS expires; and
    searching for a home network LAC utilizing a second file listing location areas that are to be considered as a part of a home network to perform a location update.

13. The method of claim 12, wherein utilizing the second file includes comparing a LAC found during scanning the frequency bands to the second file.

14. The method of claim 12, wherein if the MS does not find the home network LAC, the MS remains on an incumbent network.

15. A reselection process in a GSM network for selecting a network service provider comprising:
    providing a first file listing frequency bands to scan when the MS is not in a home MCC in a SIM of the MS; and
    determining whether the MS is on a home LAC when a period defined by a home PLMN timer in a SIM of the MS expires,
    wherein if the MS in on the home LAC, the MS remains on an incumbent network, and if the MS is not on the home LAC, the MS determines if the MS is in the home MCC.

16. The method of claim 15, wherein if the MS is in the home MCC, the MS remains on the incumbent network.

17. The method of claim 15, wherein if the MS is not in the home MCC, the MS scans the frequency bands listed in the first file, prepares a second file listing LACs found during scanning, and searches for a preferred network LAC to attempt to perform a location update.

18. The method of claim 17, wherein the MS utilizes a third file including a list of location areas of preferred network to search for the preferred network LAC.

19. The method of claim 18, wherein if the MS does not find the preferred network LAC, the MS searches for a preferred network PLMN.

20. The method of claim 19, wherein if the MS does not find the preferred network PLMN, the MS remains on the incumbent network.

21. A reselection process in a GSM network for selecting a network service provider for a MS when the MS loses a network signal comprising:
    providing a plurality of files on a SIM of the MS;
    scanning frequency bands according to an order in a first file when a period defined by a home PLMN timer in the SIM of the MS expires;
    searching for a home network LAC; and
    attempting to perform a location update on the home network LAC, wherein the home network LAC is defined in a second file in the SIM of the MS.

22. The method of claim 21, wherein the MS scans the frequency bands when the MS loses the network signal while attached to a home network.

23. The method of claim 21, wherein if the MS does not find the home network LAC, the MS searches for a preferred network LAC.

24. The method of claim 23, wherein if the MS does not find the preferred network LAC, the MS searches for a preferred network PLMN.

25. The method of claim 21, wherein the MS scans the frequency bands scans when the MS loses the network signal while attached to a network other than a home network.

26. The method of claim 25, wherein the MS determines whether the MS is in a home MCC before scanning the frequency bands.

27. The method of claim 26, wherein if the MS is in the home MCC, the MS scans the frequency bands according to a third file that dictates which frequency bands to scan and a fourth file that dictates in what order to scan the frequency bands within a home MCC.

28. The method of claim 26, wherein if the MS is not in the home MCC, the MS scans the frequency bands according to an order in a fifth file that dictates in what order to scan frequency bands when the MS is not in a home MCC.

29. The method of claim 21, wherein if the MS does not find the home network LAC, the MS searches for a preferred network LAC.

30. The method of claim 23, wherein if the MS does not find the preferred network LAC, the MS searches for a preferred network PLMN.

* * * * *